US012498392B2

(12) United States Patent
Martini et al.

(10) Patent No.: US 12,498,392 B2
(45) Date of Patent: Dec. 16, 2025

(54) DUAL AXIS ACCELEROMETER WITH COMPENSATION ELECTRODES

(71) Applicant: InvenSense, Inc., San Jose, CA (US)

(72) Inventors: Roberto Martini, Milan (IT); Luca Coronato, Corsico (IT); Xian Huang, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 350 days.

(21) Appl. No.: 18/119,492

(22) Filed: Mar. 9, 2023

(65) Prior Publication Data

US 2024/0302405 A1  Sep. 12, 2024

(51) Int. Cl.
| | |
|---|---|
| *G01P 15/18* | (2013.01) |
| *B81B 7/02* | (2006.01) |
| *G01P 15/125* | (2006.01) |
| G01P 15/08 | (2006.01) |

(52) U.S. Cl.
CPC ............. *G01P 15/18* (2013.01); *B81B 7/02* (2013.01); *G01P 15/125* (2013.01); *B81B 2201/0235* (2013.01); *G01P 2015/0848* (2013.01)

(58) Field of Classification Search
CPC ....................................... G01P 15/18
USPC ....................................... 73/514.32
See application file for complete search history.

(56) References Cited

U.S. PATENT DOCUMENTS

| | | | |
|---|---|---|---|
| 9,246,017 B2 | 1/2016 | Heide et al. | |
| 9,279,825 B2* | 3/2016 | Rytkönen | ................... G01P 1/00 |
| 10,203,351 B2 | 2/2019 | Zhang | |
| 11,650,221 B2 | 5/2023 | Tocchio et al. | |
| 2016/0097791 A1 | 4/2016 | Zhang | |
| 2019/0049481 A1* | 2/2019 | Zhang | ...................... G01P 15/18 |
| 2020/0141732 A1* | 5/2020 | Acar | ................... G01P 15/0802 |
| 2021/0102970 A1 | 4/2021 | Gafforelli et al. | |
| 2021/0293847 A1 | 9/2021 | Liukku et al. | |
| 2022/0196699 A1 | 6/2022 | Jia et al. | |

* cited by examiner

*Primary Examiner* — Walter L Lindsay, Jr.
*Assistant Examiner* — Philip T Fadul
(74) *Attorney, Agent, or Firm* — Van Hoven PC; Joshua Van Hoven

(57) ABSTRACT

A dual axis accelerometer with a single proof mass measures in-plane acceleration (e.g., either along an x-axis or a y-axis), out-of-plane acceleration (e.g., normal to an x-y plane), and tilt of a fixed portion of a MEMS layer (e.g., normal to the x-y plane). In response to a tilt measurement, the dual-axis accelerometer compensates any offset (e.g., variability) of the out-of-plane accelerometer in order to maintain offset stability. In some embodiments, multiple dual axis accelerometers, perpendicularly configured, may be implemented via processing circuitry to offer three axis sensitivity capability.

23 Claims, 6 Drawing Sheets

502 — Receive a first signal from a multi-axis MEMS accelerometer, wherein the first signal has a first frequency 504 — Receive a second signal from the multi-axis MEMS accelerometer, wherein the second signal has the first frequency 506 — Receive a third signal from the multi-axis MEMS accelerometer, wherein the third signal has a second frequency, and wherein the third signal is received as a combined signal 508 — Demultiplex the third signal and one of the first signal or the second signal within the combined signal 510 — Determine an in-plane acceleration based on the first signal 512 — Determine an out-of-plane acceleration based on the second signal 514 — Determine a tilt based on the third signal

FIG. 5

DUAL AXIS ACCELEROMETER WITH COMPENSATION ELECTRODES

BACKGROUND

Numerous items such as smart phones, smart watches, tablets, automobiles, aerial drones, appliances, aircraft, exercise aids, and game controllers may utilize sensors such as microelectromechanical system (MEMS) sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognizing skid or roll-over conditions).

MEMS sensors may be fabricated using semiconductor manufacturing techniques. A MEMS sensor may include movable proof masses that can respond to forces such as linear acceleration (e.g., for MEMS accelerometers), angular velocity (e.g., for MEMS gyroscopes), pressure, and magnetic field. The operation of these forces on the movable proof masses may be measured based on the movement of the proof masses in response to the forces. In some implementations, this movement is measured based on distance between the movable proof masses and fixed electrodes, which form capacitors for sensing the movement.

The MEMS sensor may include multiple layers that are manufactured to collectively form the sensor cavity and components, such as a MEMS layer, cap layer, and base substrate layer. These layers typically have parallel surfaces with respect to each other. The movable proof masses may be located in the MEMS layer. When fixed electrodes are also located within the MEMS layer, movement of the movable proof masses within the MEMS layer (in-plane movement) relative to the fixed electrodes may be used to measure a force along a plane of the MEMS layer. When fixed electrodes are located on another layer, movement of the movable proof masses outside the plane of the MEMS layer (out-of-plane movement) relative to the fixed electrodes may be used to measure a force out of the plane of the MEMS layer (e.g., perpendicular to the MEMS layer). The MEMS sensors may be designed based on expected relative locations of the movable proof masses and the fixed electrodes, both in the absence of external forces and in response to external forces. If a particular MEMS sensor departs from those expected relative locations due to factors such as manufacturing tolerances, wear, or external stresses applied to the sensor, the measurement of the desired force by the sensor may be inaccurate.

The size or footprint of the MEMS sensor (e.g., accelerometer, gyroscope, barometer, etc.) is an important feature to consider when planning the printed circuit board (PCB) layout of a device, and there is an ongoing desire to reduce overall footprint to facilitate smaller device configurations. In some known approaches, MEMS layouts may include individual accelerometers for sensing in-plane and out-of-plane external forces (e.g., resulting in a larger die area), which may increase the cost of a product to an unreasonable price. To lower product cost, the respective area of one or more accelerometers within the MEMS die may be reduced, however, this reduction in size may degrade offset stability of the one or more accelerometers and, ultimately, lessen the performance of the MEMS sensor. Particularly for low-cost applications, it is desirable to reduce the footprint of an accelerometer within the MEMS floorplan without compromising offset stability.

SUMMARY

In an embodiment of the present disclosure, a multi-axis microelectromechanical system (MEMS) accelerometer comprises one or more anchors and a MEMS structure within a MEMS layer, comprising at least one proof mass coupled to the one or more anchors via one or more springs, the at least one proof mass configured to move out-of-plane in response to an out-of-plane force and to move in-plane in response to an in-plane force. The multi-axis MEMS accelerometer may further comprise one or more out-of-plane sense electrodes configured to measure the out-of-plane force based on the out-of-plane movement of the at least one proof mass, one or more in-plane sense electrodes configured to measure the in-plane force based on the in-plane movement of the at least one proof mass, and one or more tilt sense electrodes configured to measure a tilt of a fixed portion of the MEMS layer.

In an embodiment of the present disclosure, a multi-axis MEMS accelerometer comprises a first MEMS accelerometer, comprising a first MEMS structure in a first MEMS layer including a first proof mass configured to translate in-plane in response to a first in-plane force and to move out-of-plane in response to an out-of-plane force perpendicular to the first in-plane force, and a first fixed portion within the first MEMS layer, wherein one or more first in-plane electrodes are located adjacent to the first proof mass to form a first capacitor that changes with the in-plane translation of the first proof mass. The first MEMS accelerometer may further comprise a first out-of-plane electrode located below the first proof mass to form a second capacitance that changes with the out-of-plane movement of the first proof mass, and a tilt electrode located below the first fixed portion to form a third capacitor with the first fixed portion that has a third capacitance that is based on a tilt of the first fixed portion. The multi-axis MEMS accelerometer may further comprise processing circuitry configured to determine a first in-plane acceleration based on the first capacitance, to determine an out-of-plane acceleration based on the second capacitance, and to determine a tilt of the first fixed portion of the MEMS layer based on the third capacitance.

In an embodiment of the present disclosure, a method comprises receiving a first signal from a multi-axis MEMS accelerometer having a first frequency. The first signal may be based on an in-plane movement between a proof mass in a MEMS layer and at least one fixed electrode of a fixed portion of the MEMS layer. The method may further comprise receiving a second signal from the multi-axis MEMS accelerometer having the first frequency. The second signal may be based on an out-of-plane movement between the proof mass and at least one out-of-plane sense electrode. The method may further comprise receiving a third signal from the multi-axis MEMS accelerometer having a second frequency. The third signal may be based on an out-of-plane tilt of the fixed portion of the MEMS layer and at least one tilt electrode. In some embodiments, the third signal may be received as a combined signal with one of the first signal or the second signal. The method may further comprise demultiplexing, from the combined signal based on the first frequency and the second frequency, the third signal and the one of the first signal or the second signal within the combined signal. The method may further comprise determining an in-plane acceleration based on the first signal, determining an out-of-plane acceleration based on the second signal, and determining a tilt based on the third signal.

BRIEF DESCRIPTION OF DRAWINGS

The above and other features of the present disclosure, its nature, and various advantages will be more apparent upon consideration of the following detailed description, taken in conjunction with the accompanying drawings in which:

FIG. 5 shows an illustrative flowchart for determining tilt of a MEMS layer in accordance with an embodiment of the present disclosure.

DETAILED DESCRIPTION

In example illustrations herein, a dual axis accelerometer (e.g., including one axis in-plane and one axis out-of-plane) may be implemented that facilitates a reduction in overall size while also allowing for compensation of an offset of the out-of-plane accelerometer. For example, if an in-plane accelerometer is tilted, a measurement of the tilt may be used to compensate an offset of an out-of-plane acceleration and maintain offset stability. In at least some example approaches, a differential of a rotation of a proof mass with respect to out-of-plane sense electrodes may be employed to measure the tilt and/or determine an offset of the out-of-plane accelerometer.

Figure 1:
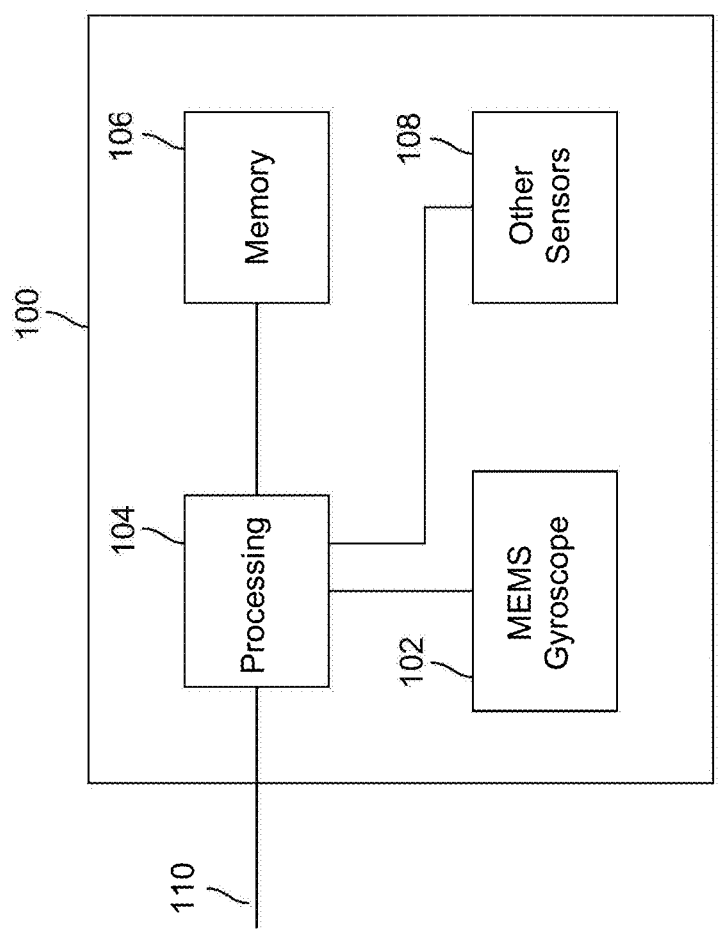
FIG. 1 shows an illustrative MEMS system in accordance with an embodiment of the present disclosure.

FIG. 1 shows an illustrative MEMS system 100 in accordance with an embodiment of the present disclosure. Although particular components are depicted in FIG. 1, it will be understood that other suitable combinations of the MEMS, processing components, memory, and other circuitry may be utilized as necessary for different applications and systems. In at least some embodiments, the circuitry, devices, systems, and methods described herein are described in the context of a system including processing circuitry configured to compensate an offset of out-of-plane acceleration with a tilt of a fixed portion of a MEMS layer (e.g., an in-plane accelerometer). More specifically, in at least some examples, the processing circuitry is configured to implement a dual axis accelerometer with a single proof mass that measures in-plane acceleration (e.g., via a differential of a translation of the proof mass with respect to one or more in-plane sense electrodes by way of in-plane springs), out-of-plane acceleration (e.g., via a differential of a rotation of the proof mass with respect to one or more out-of-plane sense electrodes by way of torsional springs), and tilt of the fixed portion of the MEMS layer (e.g., based on a distance between the fixed portion of the MEMS layer and one or more tilt sense, or reference, electrodes). It will be understood that the in-plane acceleration may be oriented and/or measured in the MEMS layer (e.g., along the x-axis or the y-axis), and the out-of-plane acceleration may be oriented and/or measured normal to the MEMS layer (e.g., out of the x-y plane).

Processing circuitry 104 may include one or more components providing processing based on the requirements of the MEMS system 100. In some embodiments, processing circuitry 104 may include hardware control logic that may be integrated within a chip of a sensor (e.g., on a base substrate of a MEMS gyroscope 102 or other sensors 108, or on an adjacent portion of a chip to the MEMS gyroscope 102 or other sensors 108) to control the operation of the MEMS gyroscope 102 or other sensors 108 and perform aspects of processing for the MEMS gyroscope 102 or the other sensors 108. In some embodiments, the MEMS gyroscope 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS gyroscope 102 by interacting with the hardware control logic and processing signals received from MEMS gyroscope 102. The microprocessor may interact with other sensors 108 in a similar manner. In some embodiments, some or all of the functions of the processing circuitry 104, and in some embodiments, of memory 106, may be implemented on an application specific integrated circuit ("ASIC") and/or a field programmable gate array ("FPGA"). In some embodiments, MEMS gyroscope 102 may be referred to as a variety of MEMS sensors (e.g., an accelerometer, a barometer, an inertial measurement unit, a magnetometer, etc.).

Although in some embodiments (not depicted in FIG. 1), the MEMS gyroscope 102 or other sensors 108 may communicate directly with external circuitry (e.g., via a serial bus or direct connection to sensor outputs and control inputs), in an embodiment the processing circuitry 104 may process data received from the MEMS gyroscope 102 and other sensors 108 and communicate with external components via a communication interface 110 (e.g., a serial peripheral interface (SPI) or I2C bus, in automotive applications a controller area network (CAN) or Local Interconnect Network (LIN) bus, or in other applications a suitably wired or wireless communications interface as is known in the art). The processing circuitry 104 may convert signals received from the MEMS gyroscope 102 and other sensors 108 into appropriate measurement units (e.g., based on settings provided by other computing units communicating over the communication interface 110) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS gyroscope 102 or other sensors 108.

In some embodiments, certain types of information may be determined based on data from multiple MEMS gyroscopes 102 and other sensors 108 in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

In some embodiments, multiple dual-axis accelerometers may be implemented with a first accelerometer (e.g., measuring acceleration along an x-axis via a differential of a first proof mass translation) orthogonal to a second accelerometer (e.g., measuring acceleration along a y-axis via a differential of a second proof mass translation), while both the first and the second accelerometers measure out-of-plane acceleration along a z-axis (e.g., via respective differential rotations of the first proof mass and the second proof mass) as well as respective tilts of a first fixed portion of the first accelerometer (e.g., including a first MEMS layer) and a second fixed portion of the second accelerometer (e.g., including a second MEMS layer). It will be understood that, in response to applying signals to the first proof mass, the second proof mass, and the one or more tilt sense, or reference, electrodes of the first and second accelerometers, processing circuitry 104 may receive signals from the one or more out-of-plane sense electrodes of the first and second accelerometers (e.g., each measuring z-axis acceleration), the one or more in-plane sense electrodes of the first accelerometer (e.g., measuring x-axis acceleration), the one or more in-plane sense electrodes of the second accelerometer (e.g., measuring y-axis acceleration), the first fixed portion of the first accelerometer (e.g., measuring tilt of the first accelerometer), and the second fixed portion of the second accelerometer (e.g., measuring tilt of the second accelerometer) in what may be described herein as acceleration sense (AS) sensing. It will be understood that, in response to applying signals to the one or more out-of-plane sense electrodes and the one or more tilt sense electrodes of the first and second accelerometers, processing circuitry 104 may receive signals from the first proof mass (e.g., measuring z-axis acceleration directly and x-axis acceleration indirectly), the second proof mass (e.g., measuring z-axis acceleration directly and y-axis acceleration indirectly), the first fixed portion of the first accelerometer (e.g., measuring tilt of the first accelerometer), and the second fixed portion of the second accelerometer (e.g., measuring tilt of the second accelerometer) in what may be described herein as proof mass (PM) sensing.

Figure 2:
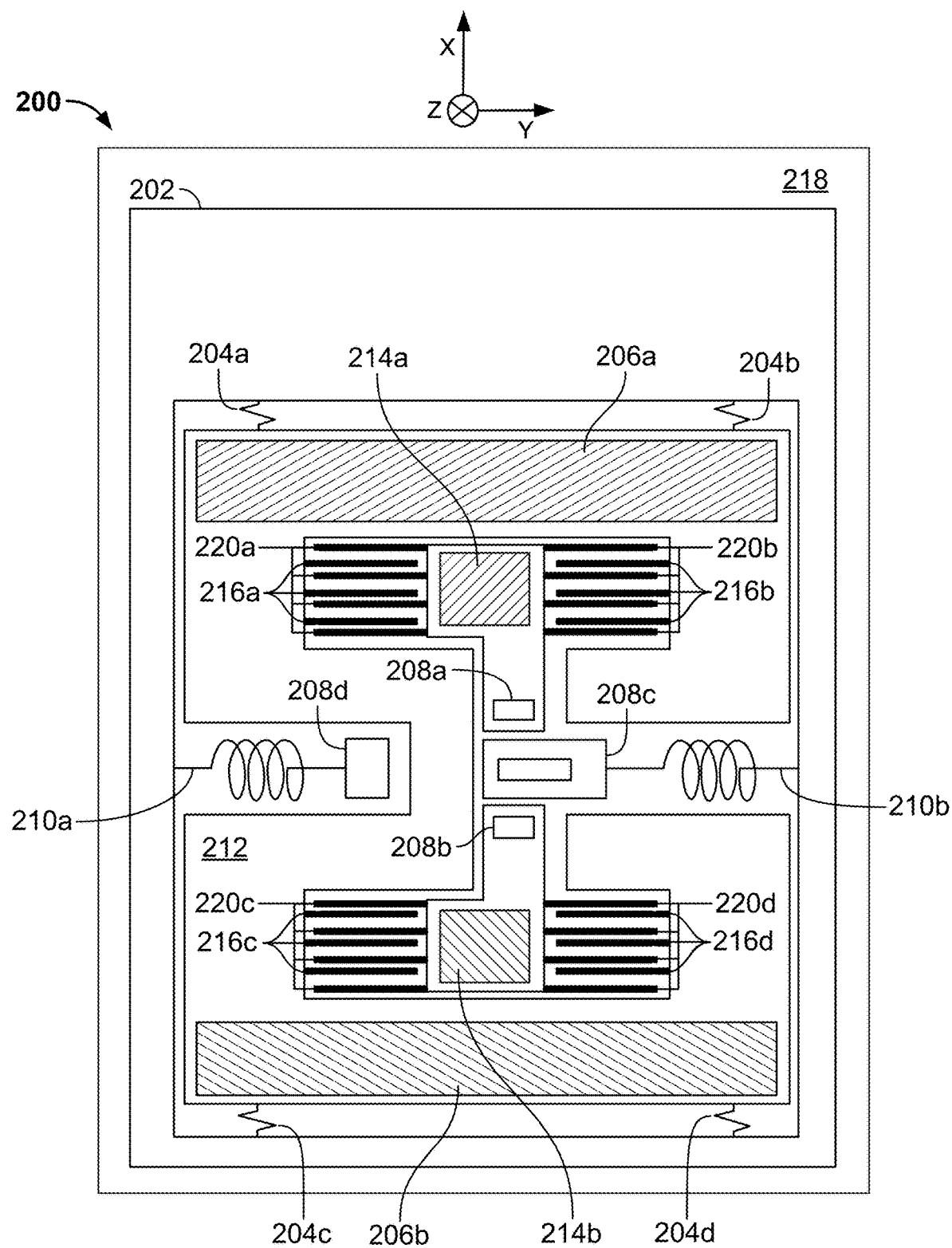
FIG. 2 shows an illustrative dual axis accelerometer in accordance with an embodiment of the present disclosure.

FIG. 2 shows an illustrative dual axis accelerometer in accordance with an embodiment of the present disclosure. Generally, system 200 includes a frame 202 movably supported upon a substrate 218 (e.g., a CMOS). In the depicted embodiment, system 200 includes frame 202, in-plane springs 204a-204d, out-of-plane sense electrodes 206a, 206b, anchors 208a-208d, torsional springs 210a, 210b, proof mass 212, tilt sense (e.g., reference) electrodes 214a, 214b, movable in-plane sense electrodes 216a-216d, fixed in-plane sense electrodes 220a-220d, and substrate layer 218. Although particular components are depicted in certain configurations for system 200, components may be removed, modified, or substituted and additional components (e.g., electrodes, springs, a drive mass, processing circuitry, etc.) may be added in certain embodiments.

Proof mass 212, which is suspended in a MEMS layer (e.g., including frame 202, proof mass 212, in-plane springs 204a-204d, torsional springs 210a, 210b, anchors 208a-208d, movable in-plane sense electrodes 216a-216d, and fixed in-plane sense electrodes 220a-220d), couples to frame 202 via torsional springs 210a, 210b and in-plane springs 204a-204d. Generally, the proof mass 212 may measure in-plane acceleration or force by in-plane (i.e., in the x-y plane) translation of the proof mass 212 relative to the substrate 218. Further, out-of-plane (i.e., along the z-direction) acceleration or force may be determined by rotation of the proof mass 212 about torsional springs 210a, 210b. More specifically, the proof mass 212 may be asymmetrically balanced with respect to the torsional springs 210a, 210b, such that an acceleration or force out-of-plane causes the proof mass 212 to tilt about the torsional springs 210a, 210b. It will be understood that any number of torsional springs and/or in-plane springs may be used to connect proof mass 212 to frame 202. In at least some example approaches, one or more comb electrodes may be used to sense movement of the proof mass 212 in the MEMS layer/plane. For example, in the example illustrated in FIG. 2, in-plane springs 204a-204d enable proof mass 212, to which movable in-plane sense electrodes 216a-216d are fixed, to translate (e.g., move in-plane) with respect to fixed in-plane sense electrodes 220a-220d within the MEMS layer in response to an in-plane force (e.g., acceleration along the x-axis or the y-axis). The in-plane sense electrodes 220a-220d are fixed to the underlying substrate 218. As shown in FIG. 2, in at least some embodiments movable in-plane sense electrodes 216a-216d may be configured as one or more parallel plates (e.g., with a first parallel plate 216 coupled to a movable MEMS component—e.g., proof mass 212—and a second parallel plate 220 coupled to a fixed MEMS component—e.g., anchors 208a, 208b) or any other appropriate electrode configuration. In some embodiments, in-plane springs 204a-204d may be rigid in a direction normal to the MEMS layer (e.g., in a z-direction) to ensure the proof mass 212 accurately measures in-plane acceleration. The translation of proof mass 212 and the movable in-plane sense electrodes 216a-216d with respect to the fixed in-plane sense electrodes 220a-220d creates a moving capacitor, which generally measures in-plane force and/or acceleration. More specifically, a differential of a velocity of the movable in-plane sense electrodes 216a-216d relative to the fixed in-plane sense electrodes 220a-220d, or another measurement of a degree of capacitive engagement between the movable electrodes 216 and fixed electrodes 220, may be output as a capacitive signal, commensurate to the in-plane force applied to the substrate 218. The capacitive signal, or other measurement of acceleration, may be output, for example, to processing circuitry (e.g., processing circuitry 104) external to system 200 to determine force applied to the substrate 218. Accordingly, processing circuitry 104 may determine in-plane force and/or acceleration applied to the substrate 218 and/or frame 202. Fixed in-plane sense electrodes 220a, 220b connect to anchor 208a, and fixed in-plane sense electrodes 220c, 220d connect to anchor 208b such that fixed in-plane sense electrodes 220a-220d are secured in the MEMS layer and transmit in-plane acceleration signals, based on translative capacitive engagement with movable in-plane sense electrodes 216a-216d, to the fixed portion (e.g., anchors 208a-208c) of the MEMS layer. In some embodiments, there may be any number of in-plane sense electrodes within the MEMS layer of system 200.

In addition to the in-plane movement measurements described above, the system 200 may also measure out-of-plane movements. In the example illustrated, torsional springs 210a, 210b enable proof mass 212 to move out-of-plane (e.g., rotate) with respect to out-of-plane sense electrodes 206a, 206b normal to the MEMS layer (e.g., about the y-axis out of the x-y plane) in response to an out-of-plane force (e.g., a z-axis acceleration). In some embodiments, torsional springs 210a, 210b may be rigid in a direction within the MEMS layer (e.g., along the x-axis or y-axis) to ensure proof mass 212 accurately measures out-of-plane acceleration. Proof mass 212 is suspended over out-of-plane sense electrodes 206a, 206b and rotates out-of-plane (e.g., out of the illustrated x-y plane) such that portions of proof mass 212 move closer to or farther away from (e.g., capacitively engage with) respective out-of-plane sense electrodes 206a, 206b with a degree of rotation based on the magnitude of the out-of-plane force. A differential of the rotational velocity of proof mass 212 with respect to out-of-plane sense electrodes 206a, 206b may be used to determine acceleration, e.g., by generating a capacitive signal commensurate to the out-of-plane force, that is outputted to processing circuitry (e.g., processing circuitry 104) external to system 200. Out-of-plane sense electrodes 206a, 206b are located on an upper surface, or plane, of substrate layer 218 located beneath the MEMS layer (e.g., beneath a lower surface of proof mass 212), and, in some embodiments, system 200 may include any number of out-of-plane sense electrodes. The fixed portion (e.g., anchors 208a-208d) of the MEMS layer extends through the MEMS layer to the substrate layer 218 beneath (e.g., acting as a mechanical anchoring point) and secures movable components of system 200 to frame 202 via torsional springs 210a, 210b such that, e.g., proof mass 212 suspends above out-of-plane sense electrodes 206a, 206b. Anchors 208a-208c also sense and deliver electrical signals corresponding to in-plane (e.g., x-axis or y-axis acceleration) and out-of-plane (e.g., z-axis acceleration) forces experienced by proof mass 212, while anchor 208d only serves as a mechanical anchor to secure proof mass 212, via torsional spring 210a, to frame 202 such that proof mass 212 may move out-of-plane normal to the MEMS layer. Tilt sense (e.g., reference) electrodes 214a, 214b are located on the upper surface of the substrate (e.g., CMOS) layer 218 located beneath the MEMS layer (e.g., beneath a lower surface of the fixed portion of the MEMS layer) and, due to a change in distance between the fixed portion of the MEMS layer and the tilt sense electrodes 214a, 214b, capacitively engage with the fixed portion (e.g., anchors 208a-208c) of the MEMS layer to measure a tilt of the fixed portion of the MEMS layer (e.g., including proof mass 212). For example, package deformation due to a manufacturing error may cause proof mass 212 and the MEMS layer to have a 0.5° tilt towards the substrate (e.g., CMOS) layer 218, in which case tilt sense electrodes 214a, 214b would detect the tilt, via a change in distance between the fixed portion of the MEMS layer and the tilt sense electrodes 214a, 214b, and compensate for any offset of out-of-plane acceleration with the tilt measurement to maintain offset stability. In some embodiments, frame 202 and/or proof mass 212 may cause the MEMS layer connected to torsional springs 210a, 210b to be unbalanced (e.g., have a tilt), in which case a measurement of out-of-plane acceleration (e.g., normal to the MEMS layer) may include an offset. The tilt of the fixed portion of the MEMS layer, measured by tilt sense electrodes 214a, 214b, may be used to compensate for any offset of out-of-plane acceleration caused by, e.g., a weight imbalance due to frame 202 and/or proof mass 212.

Figure 3:
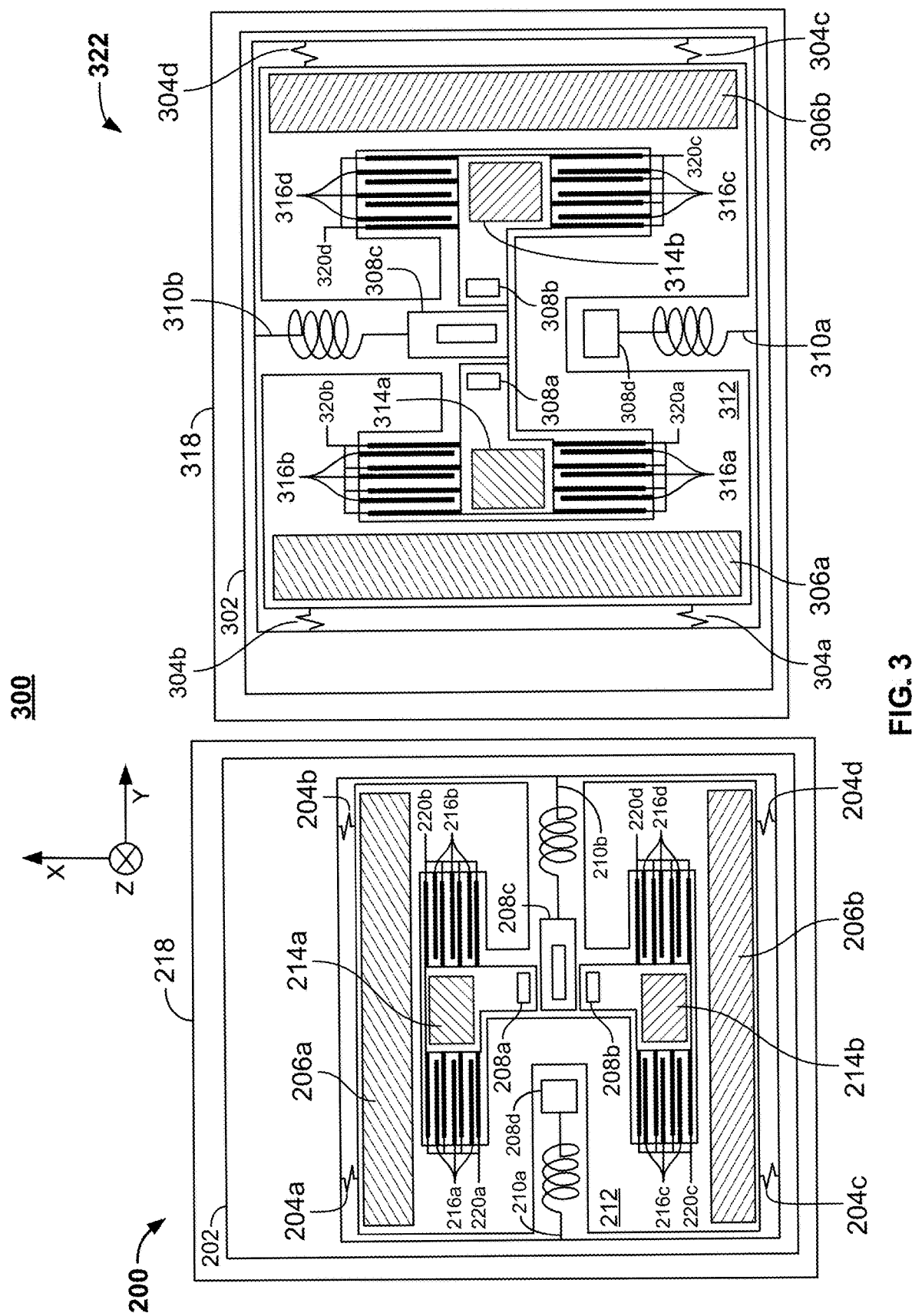
FIG. 3 shows an illustrative configuration of multiple orthogonal dual axis accelerometers in accordance with an embodiment of the present disclosure.

FIG. 3 shows an illustrative configuration of two orthogonal dual axis accelerometers in accordance with an embodiment of the present disclosure. In the depicted embodiment, system 300 includes the first MEMS accelerometer 200 of FIG. 2 oriented in a first direction (e.g., along the x-axis). For example, in response to an in-plane force (e.g., an x-axis acceleration), proof mass 212, coupled to movable in-plane sense electrodes 216a-216d, translates, via in-plane springs 204a-204d, along the x-axis with respect to fixed in-plane sense electrodes 220a-220d (e.g., acting as a moving capacitor) to measure the in-plane force. In addition to being rigid in the direction normal to the MEMS layer (e.g., out of the x-y plane), in-plane springs 204a-204d are also rigid in a second direction along the y-axis such that the proof mass 212 accurately measures acceleration along the x-axis (i.e., by being limited to movement in the x-direction in the MEMS layer). System 300 also includes a second MEMS accelerometer 322, which further includes frame 302 (e.g., corresponding to frame 202), in-plane springs 304a-304d (corresponding to in-plane springs 204a-204d), out-of-plane sense electrodes 306a, 306b (corresponding to out-of-plane sense electrodes 206a, 206b), anchors 308a-308d (e.g., a second fixed portion of a second MEMS layer) (corresponding to anchors 208a-208d (e.g., a first fixed portion of the first MEMS layer)), torsional springs 310a, 310b (corresponding to torsional springs 210a, 210b), proof mass 312 (corresponding to proof mass 212), tilt sense (e.g., reference) electrodes 314a, 314b (corresponding to tilt sense electrodes 214a, 214b), movable in-plane sense electrodes 316a-316d (corresponding to movable in-plane sense electrodes 216a-216d), fixed in-plane sense electrodes 320a-320d (corresponding to fixed in-plane sense electrodes 220a-220d), and substrate 318 (corresponding to substrate 218) oriented in the second direction (e.g., along the y-axis) orthogonal to the first direction. For example, in response to an in-plane force (e.g., a y-axis acceleration), proof mass 312, coupled to movable in-plane sense electrodes 316a-316d, translates, via in-plane springs 304a-304d, along the y-axis with respect to fixed in-plane sense electrodes 320a-320d (e.g., acting as a moving capacitor) to measure the in-plane force. Fixed in-plane sense electrodes 320a, 320b connect to anchor 308a, and fixed in-plane sense electrodes 320c, 320d connect to anchor 308b such that fixed in-plane sense electrodes 320a-320d are secured in the second MEMS layer and transmit in-plane acceleration signals, based on translative capacitive engagement with movable in-plane sense electrodes 316a-316d, to the second fixed portion (e.g., anchors 308a-308c) of the second MEMS layer. To accurately measure y-axis acceleration, in-plane springs 304a-304d may be rigid in the first direction along the x-axis and in the direction normal to the MEMS layer (e.g., out of the x-y plane). In some embodiments, the respective orientations of the dual axis accelerometers 200, 322 of system 300 may be switched such that proof mass 212 measures in-plane forces along the y-axis and proof mass 312 measures in-plane forces along the x-axis. In some embodiments, proof mass 212 and proof mass 312 (e.g., both in-plane accelerometers) may be coupled on the same substrate layer (e.g., substrate layer 218), on an adjacent substrate layer (e.g., substrate layer 318 as shown), or otherwise fixed with respect to each other. The proof mass 312 may be asymmetrically balanced with respect to the torsional springs 310a, 310b, such that an acceleration or force out-of-plane causes the proof mass 312 to tilt about the torsional springs 310a, 310b. Accordingly, the MEMS accelerometer 322 may measure out-of-plane acceleration in a similar fashion as the MEMS accelerometers 200. Although particular components are depicted in certain configurations for system 300, components may be removed, modified, or substituted and additional components (e.g., electrodes, springs, a drive mass, processing circuitry, etc.) may be added in certain embodiments.

Figure 4A:
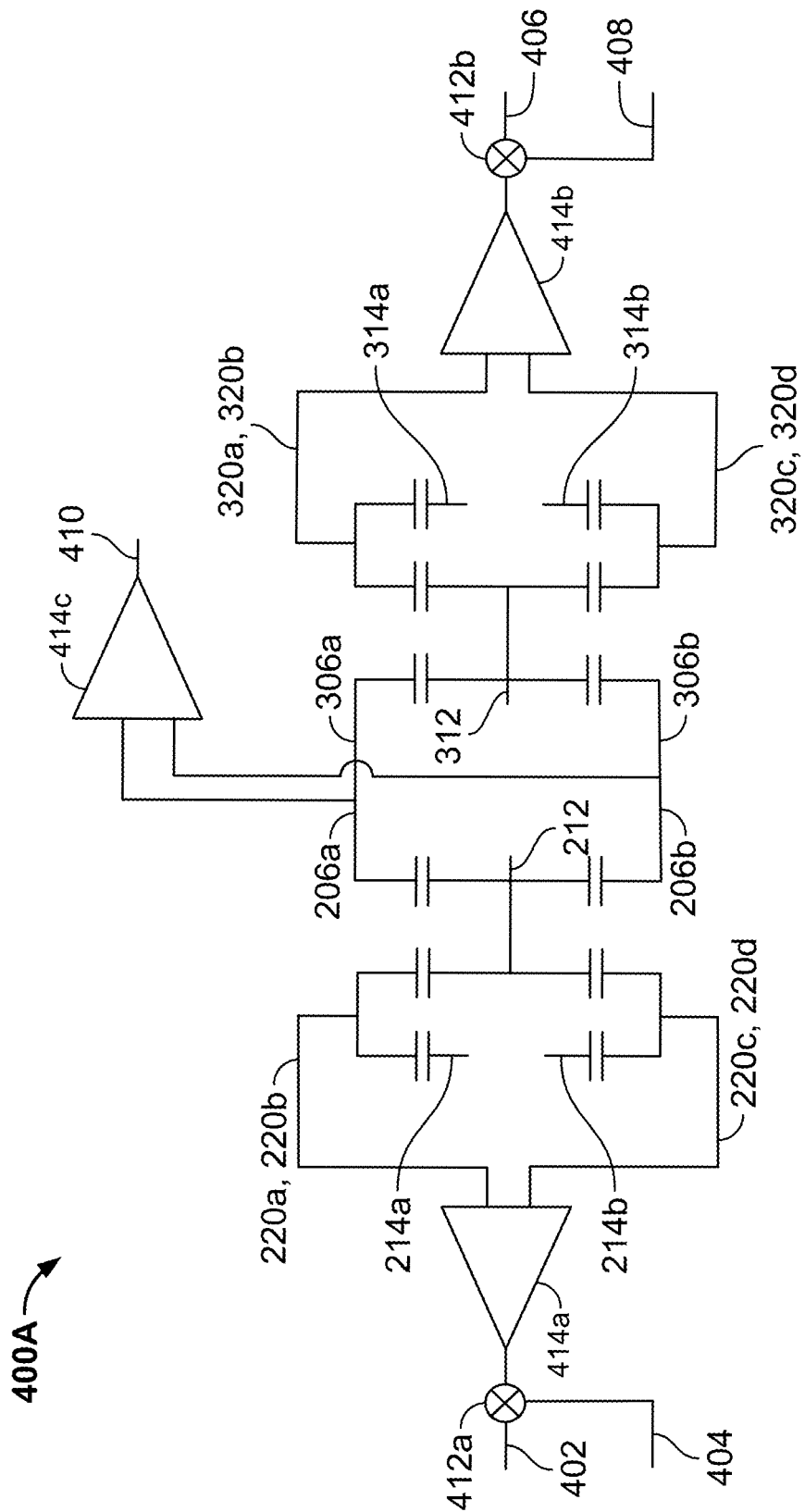
FIG. 4A shows an illustrative circuit diagram of multiple orthogonal dual axis accelerometers utilizing in-plane and out-of-plane sense electrode sensing in accordance with an embodiment of the present disclosure.
Figure 4B:
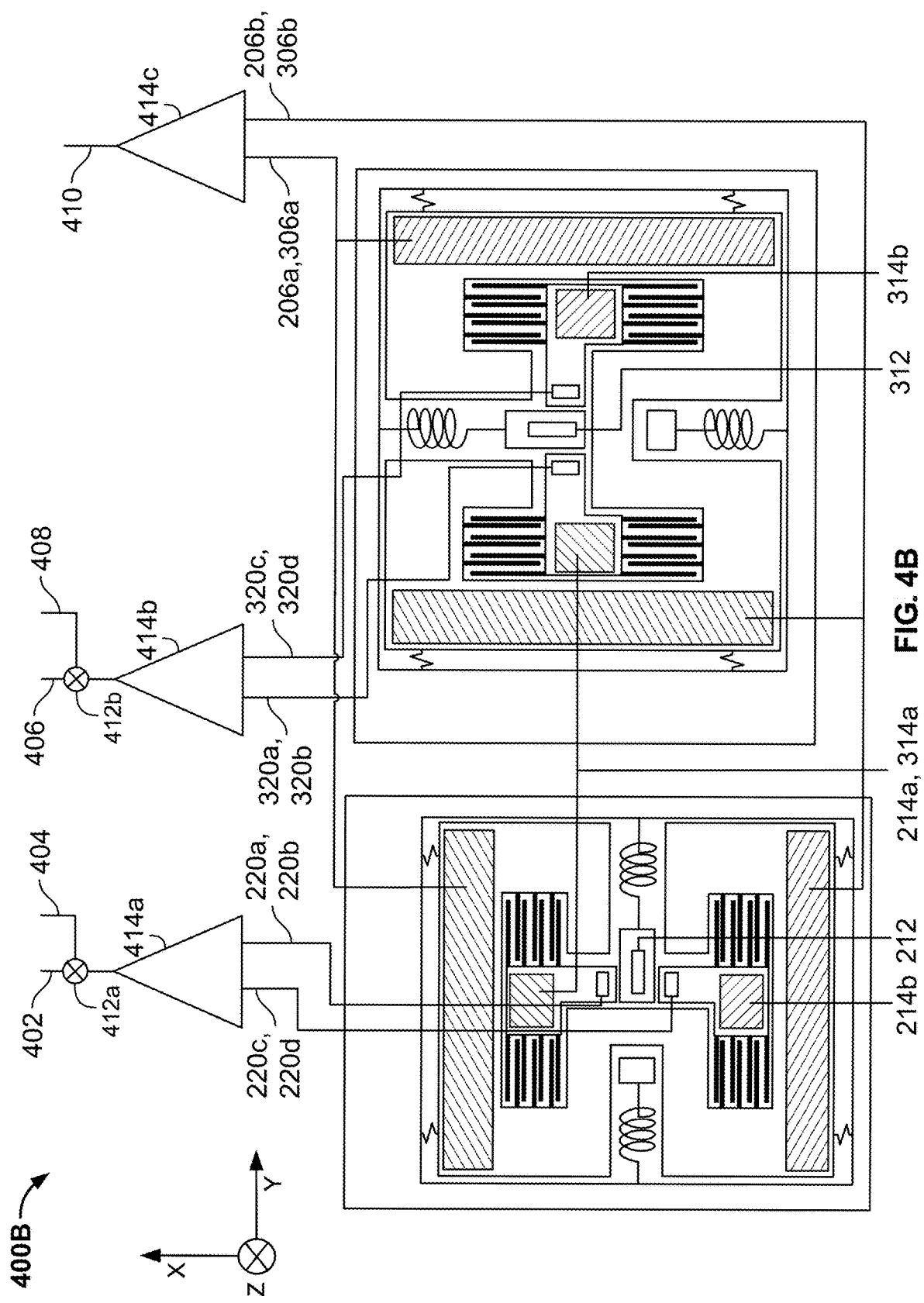
FIG. 4B shows an illustrative configuration of multiple orthogonal dual axis accelerometers integrated via in-plane and out-of-plane sense electrode sensing in accordance with an embodiment of the present disclosure.

FIG. 4A shows an illustrative circuit diagram of multiple orthogonal dual axis accelerometers utilizing in-plane and out-of-plane sense electrode sensing in accordance with an embodiment of the present disclosure, while FIG. 4B shows an illustrative configuration of multiple orthogonal dual axis accelerometers integrated via in-plane and out-of-plane sense electrode sensing, in accordance with an embodiment of the present disclosure. In the depicted embodiments, systems 400A and 400B each include components of FIG. 3, specifically out-of-plane sense electrodes 206a, 206b, proof mass 212, tilt sense electrodes 214a, 214b, and fixed in-plane sense electrodes 220a-220d oriented in a first direction along the x-axis. In addition, systems 400A and 400B each include out-of-plane sense electrodes 306a, 306b, proof mass 312, tilt sense electrodes 314a, 314b, and fixed in-plane sense electrodes 320a-320d oriented in a second direction, orthogonal to the first direction, along the y-axis. Systems 400A and 400B each include processing circuitry (e.g., processing circuitry 104) components as well, namely capacitance-to-voltage (C2V) converters 414a-414c, demodulators 412a, 412b, first in-plane acceleration signal 402, first tilt signal 404, second in-plane acceleration signal 406, second tilt signal 408, and out-of-plane acceleration signal 410. Accordingly, each of systems 400A and 400B perform as a three-axis accelerometer measuring in-plane acceleration along the x-axis and/or y-axis and measuring out-of-plane acceleration/tilt out of the x-y plane. In some embodiments, a multi-axis MEMS accelerometer (e.g., sensitive along the x-axis and the y-axis) may be integrated with a single-axis MEMS accelerometer (e.g., sensitive out of the x-y plane), via processing circuitry (e.g., processing circuitry 104), to achieve the functionality of a three-axis MEMS accelerometer. Although particular components are depicted in certain configurations for systems 400A and 400B, components may be removed, modified, or substituted and additional components (e.g., converters, capacitors, springs, electrodes, processing circuitry, etc.) may be added in certain embodiments.

Processing circuitry (e.g., processing circuitry 104—a phase-locked loop (PLL)) applies a first drive signal, with a first frequency, to proof mass 212 and a second drive signal, with a second frequency, to tilt sense electrodes 214a, 214b. In response to the first drive signal with the first frequency, proof mass 212, coupled to movable in-plane sense electrodes (e.g., movable in-plane sense electrodes 216a-216d), translates in-plane (e.g., along the x-axis) with respect to fixed in-plane sense electrodes 220a-220d within the first MEMS layer in accordance with the first frequency. The translation of proof mass 212 and the movable in-plane sense electrodes with respect to fixed in-plane sense electrodes 220a-220d creates a moving capacitor, and a differential of a velocity of the capacitive engagement between the movable in-plane sense electrodes (e.g., movable in-plane sense electrodes 216a-216d) and fixed in-plane sense electrodes 220a-220d produces a first set of one or more first sense signals (e.g., a first in-plane acceleration based on a first capacitance), each with the first frequency, that is delivered to C2V 414a. Fixed in-plane sense electrodes 220a-220d extend from a first fixed portion (e.g., anchors 208a, 208b) of the first MEMS layer, so, in some embodiments, in-plane acceleration signals (e.g., along the x-axis) received from fixed in-plane sense electrodes 220a-220d may be modulated with tilt signals, received from tilt sense electrodes 214a, 214b, generated with respect to the first fixed portion of the first MEMS layer. Tilt sense electrodes 214a, 214b receive the second drive signal, with the second frequency, and capacitively engage with the first fixed portion (e.g., anchors 208a-208c) of the first MEMS layer to measure tilt. The tilt of the first fixed portion of the first MEMS layer (e.g., including proof mass 212) is based on a change in distance (e.g., out of the x-y plane) between the first fixed portion of the first MEMS layer and the tilt sense electrodes 214a, 214b, e.g., due to package deformation. Capacitive engagement between the first fixed portion of the first MEMS layer and the tilt sense electrodes 214a, 214b produces a first set of one or more third sense signals (e.g., measuring a tilt of the first fixed portion of the first MEMS layer), each with the second frequency, that may be modulated with the first set of one or more first sense signals (e.g., the x-axis acceleration measured by fixed in-plane sense electrodes 220a-220d), each with the first frequency, via C2V 414a. Demodulator 412a receives a first combined (e.g., modulated) signal (e.g., including the first set of one or more first sense signals, each with the first frequency, and the first set of one or more third sense signals, each with the second frequency) from C2V 414a and demodulates (e.g., separates) the first combined signal into first in-plane acceleration signal 402 (e.g., the first set of one or more first sense signals measured along the x-axis) and first tilt signal 404 (e.g., the first set of one or more third sense signals measuring tilt, about the y-axis out of the x-y plane, of the first fixed portion of the first MEMS layer) based on, e.g., the first frequency and the second frequency. In some embodiments, the first set of one or more first sense signals and the first set of one or more third sense signals may be modulated based on phase, amplitude, timing pattern, and orthogonal codes, as opposed to frequency.

Proof mass 312 receives the first drive signal, with the first frequency, and tilt sense electrodes 314a, 314b receive the second drive signal, with the second frequency, from processing circuitry (e.g., processing circuitry 104—a PLL) as well. In response to the first drive signal, proof mass 312, which couples to movable in-plane sense electrodes (e.g., movable in-plane sense electrodes 316a-316d), translates in-plane (e.g., along the y-axis) with respect to fixed in-plane sense electrodes 320a-320d within the second MEMS layer in accordance with the first frequency. The translation of proof mass 312 and the movable in-plane sense electrodes with respect to fixed in-plane sense electrodes 320a-320d creates a moving capacitor, and a differential of a velocity of the capacitive engagement between the movable in-plane sense electrodes (e.g., movable in-plane sense electrodes 316a-316d) and fixed in-plane sense electrodes 320a-320d produces a second set of one or more first sense signals (e.g., a second in-plane acceleration based on a fourth capacitance), each with the first frequency, that is delivered to C2V 414b. Fixed in-plane sense electrodes 320a-320d extend from a second fixed portion (e.g., anchors 308a, 308b) of the second MEMS layer, so, in some embodiments, in-plane acceleration signals (e.g., along the y-axis) received from fixed in-plane sense electrodes 320a-320d may be modulated with tilt signals, received from tilt sense electrodes 314a, 314b, generated with respect to the second fixed portion of the second MEMS layer. Tilt sense electrodes 314a, 314b receive the second drive signal, with the second frequency, and capacitively engage with the second fixed portion (e.g., anchors 308a-308c) of the second MEMS layer to measure tilt. The tilt of the second fixed portion of the second MEMS layer (e.g., including proof mass 312) is based on a change in distance between the second fixed portion of the second MEMS layer and tilt sense electrodes 314a, 314b, e.g., due to package deformation. Capacitive engagement between the second fixed portion of the second MEMS layer and the tilt sense electrodes 314a, 314b produces a second set of one or more third sense signals (e.g., a tilt of the second fixed portion of the second MEMS layer based on a sixth capacitance), each with the second frequency, that are modulated with the second set of one or more first sense signals (e.g., the y-axis acceleration measured by fixed in-plane sense electrodes 320a-320d), each with the first frequency, via C2V 414b. Demodulator 412b receives a second combined (e.g., modulated) signal (e.g., including the second set of one or more first sense signals, each with the first frequency, and the second set of one or more third sense signals, each with the second frequency) from C2V 414b and demodulates (e.g., separates) the second combined signal into second in-plane acceleration signal 406 (e.g., the second set of one or more first sense signals measured along the y-axis) and second tilt signal 408 (e.g., the second set of one or more third sense signals measuring tilt, about the x-axis of the x-y plane, of the second fixed portion of the second MEMS layer) based on, e.g., the first frequency and the second frequency. In some embodiments, the second set of one or more first sense signals and the second set of one or more third sense signals may be modulated based on phase, amplitude, timing pattern, and orthogonal codes, as opposed to frequency.

As noted above, in addition to translating with respect to fixed in-plane sense electrodes 220a-220d, proof mass 212 may rotate out-of-plane (e.g., about the y-axis of the x-y plane) with respect to out-of-plane sense electrodes 206a, 206b in response to the first drive signal with the first frequency. In some embodiments, proof mass 212, connected to movable in-plane sense electrodes (e.g., movable in-plane sense electrodes 216a-216d), translates with respect to fixed in-plane sense electrodes 220a-220d while concurrently rotating with respect to out-of-plane sense electrodes 206a, 206b. The rotation of proof mass 212 with respect to out-of-plane sense electrodes 206a, 206b creates a moving capacitor, and a differential of a velocity as indicated by capacitive engagement between proof mass 212 and out-of-plane sense electrodes 206a, 206b produces a first set of one or more second sense signals (e.g., an out-of-plane acceleration based on a second capacitance), each with the first frequency, that is delivered to C2V 414c. Similarly, proof mass 312 receives the first drive signal, with the first frequency, and rotates out-of-plane (e.g., about the x-axis of the x-y plane) with respect to out-of-plane sense electrodes 306a, 306b in accordance with the first frequency. In some embodiments, proof mass 312, connected to movable in-plane sense electrodes (e.g., movable in-plane sense electrodes 316a-316d), translates with respect to fixed in-plane sense electrodes 320a-320d while concurrently rotating with respect to out-of-plane sense electrodes 306a, 306b. The rotation of proof mass 312 with respect to out-of-plane sense electrodes 306a, 306b creates a moving capacitor, and a differential of a velocity indicated by capacitive engagement between proof mass 312 and out-of-plane sense electrodes 306a, 306b produces a second set of one or more second sense signals (e.g., an out-of-plane acceleration based on a fifth capacitance), each with the first frequency, that are modulated with the first set of one or more second sense signals (e.g., the z-axis acceleration measured by out-of-plane sense electrodes 206a, 206b), via C2V 414c, and outputted as out-of-plane acceleration signal 410 (e.g., the first set and the second set of one or more second sense signals measured out of the x-y plane by proof mass 212 and proof mass 312). It will be understood that z-axis sensitivity of systems 400A and 400B is increased due to both proof mass 212 and proof mass 312 rotating out-of-plane (e.g., out of the x-y plane) in response to an out-of-plane force. Although signals (e.g., the first drive signal with the first frequency and the second drive signal with the second frequency) are applied to particular components and other signals (e.g., the first and the second set of one or more first sense signals, the first and the second set of one or more second sense signals, and the first and the second set of one or more third sense signals) are received from particular components, systems 400A and 400B may be configured with any suitable combination of locations where signals are applied and received.

FIG. 5 shows an illustrative flowchart for determining tilt of a MEMS layer in accordance with an embodiment of the present disclosure. Although particular steps are depicted in certain configurations for FIG. 5, steps may be removed, modified, or substituted and additional steps may be added in certain embodiments. At step 502, processing circuitry (e.g., processing circuitry 104) receives a first signal (e.g., the one or more first sense signals corresponding to x-axis acceleration measured by fixed in-plane sense electrodes 220a-220d and/or y-axis acceleration measured by fixed in-plane sense electrodes 320a-320d) from a multi-axis MEMS accelerometer, wherein the first signal has a first frequency. In some embodiments, the first signal may be based on proof mass 212, coupled to movable in-plane sense electrodes 216a-216d, translating in-plane (e.g., along the x-axis) with respect to fixed in-plane sense electrodes 220a-220d within the first MEMS layer in accordance with the first frequency. The translation of proof mass 212 and movable in-plane sense electrodes 216a-216d with respect to fixed in-plane sense electrodes 220a-220d creates a moving capacitor, and a differential of a velocity indicated by capacitive engagement between movable in-plane sense electrodes 216a-216d and fixed in-plane sense electrodes 220a-220d produces and/or contributes to the first signal (e.g., including the first in-plane acceleration based on the first capacitance). Fixed in-plane sense electrodes 220a-220d may be anchored by extending from a first fixed portion (e.g., anchors 208a, 208b) of the first MEMS layer. In some embodiments, the first signal may be based on proof mass 312, coupled to movable in-plane sense electrodes 316a-316d, translating in-plane (e.g., along the y-axis) with respect to fixed in-plane sense electrodes 320a-320d within the second MEMS layer in accordance with the first frequency. The translation of proof mass 312 and movable in-plane sense electrodes 316a-316d with respect to fixed in-plane sense electrodes 320a-320d creates a moving capacitor, and a differential of a velocity indicative of capacitive engagement between movable in-plane sense electrodes 316a-316d and fixed in-plane sense electrodes 320a-320d produces and/or contributes to the first signal (e.g., including the second in-plane acceleration based on the fourth capacitance). Fixed in-plane sense electrodes 320a-320d may be anchored by extending from a second fixed portion (e.g., anchors 308a, 308b) of the second MEMS layer.

At step 504, processing circuitry (e.g., processing circuitry 104) receives a second signal (e.g., the one or more second sense signals corresponding to z-axis acceleration measured by out-of-plane sense electrodes 206a, 206b and/or out-of-plane sense electrodes 306a, 306b) from the multi-axis MEMS accelerometer, wherein the second signal has the first frequency. In some embodiments, the second signal may be based on proof mass 212 rotating out-of-plane (e.g., about the y-axis of the x-y plane) with respect to out-of-plane sense electrodes 206a, 206b in accordance with the first frequency. The rotation of proof mass 212 with respect to out-of-plane sense electrodes 206a, 206b creates a moving capacitor, and a differential of a velocity indicative of capacitive engagement between proof mass 212 and out-of-plane sense electrodes 206a, 206b produces and/or contributes to the second signal (e.g., including the out-of-plane acceleration based on the second capacitance). In some embodiments, the second signal may be based on proof mass 312 rotating out-of-plane (e.g., about the x-axis of the x-y plane) with respect to out-of-plane sense electrodes 306a, 306b in accordance with the first frequency. The rotation of proof mass 312 with respect to out-of-plane sense electrodes 306a, 306b creates a moving capacitor, and a differential of a velocity indicative of capacitive engagement between proof mass 312 and out-of-plane sense electrodes 306a, 306b produces and/or contributes to the second signal (e.g., including the out-of-plane acceleration based on the fifth capacitance).

At step 506, processing circuitry (e.g., processing circuitry 104) receives a third signal (e.g., the one or more third sense signals corresponding to tilt of the first fixed portion of the first MEMS layer measured by tilt sense electrodes 214a, 214b and/or tilt of the second fixed portion of the second MEMS layer measured by tilt sense electrodes 314a, 314b) from the multi-axis MEMS accelerometer, wherein the third signal has a second frequency (different from the first frequency), and wherein the third signal is received as a combined (e.g., modulated) signal. In some embodiments, the third signal may be based on a change in distance (e.g., out of the x-y plane) between the first fixed portion (e.g., anchors 208a-208c) of the first MEMS layer (including proof mass 212) and tilt sense electrodes 214a, 214b, e.g., due to package deformation. Capacitive engagement between the first fixed portion of the first MEMS layer and tilt sense electrodes 214a, 214b produces and/or contributes to the third signal (e.g., including a tilt of the first fixed portion of the first MEMS layer based on the third capacitance), which includes the second frequency. In some embodiments, the third signal may be based on a change in distance (e.g., out of the x-y plane) between the second fixed portion (e.g., anchors 308a-308c) of the second MEMS layer (including proof mass 312) and tilt sense electrodes 314a, 314b. Capacitive engagement between the second fixed portion of the second MEMS layer and tilt sense electrodes 314a, 314b produces and/or contributes to the third signal (e.g., including a tilt of the second fixed portion of the second MEMS layer based on the sixth capacitance), which includes the second frequency. In some embodiments, the third signal with the second frequency (e.g., corresponding to tilt of the first fixed portion of the first MEMS layer and/or tilt of the second fixed portion of the second MEMS layer) may be modulated with the first signal with the first frequency (e.g., corresponding to x-axis acceleration and/or y-axis acceleration) to form a combined (e.g., modulated) signal and, in some embodiments, multiple combined signals via processing circuitry (e.g., processing circuitry 104).

At step 508, processing circuitry (e.g., processing circuitry 104) demultiplexes the third signal and one of the first signal or the second signal within the combined signal. It will be understood that the combined signal is separated based on the first frequency of the first and/or second signal and the second frequency of the third signal. In some embodiments, processing circuitry demultiplexes the third signal and the first and/or second signal within the combined signal based on phase, amplitude, timing pattern, and/or orthogonal codes. At step 510, processing circuitry (e.g., processing circuitry 104) determines an in-plane acceleration (e.g., first in-plane acceleration signal 402 along the x-axis and/or second in-plane acceleration signal 406 along the y-axis) based on the first signal (e.g., the one or more first sense signals corresponding to x-axis acceleration measured by fixed in-plane sense electrodes 220a-220d and/or y-axis acceleration measured by fixed in-plane sense electrodes 320a-320d). At step 512, processing circuitry (e.g., processing circuitry 104) determines an out-of-plane acceleration (e.g., out-of-plane acceleration signal 410 out of the x-y plane) based on the second signal (e.g., the one or more second sense signals corresponding to z-axis acceleration measured by out-of-plane sense electrodes 206a, 206b and/or out-of-plane sense electrodes 306a, 306b). At step 514, processing circuitry (e.g., processing circuitry 104) determines a tilt (e.g., first tilt signal 404 about the y-axis of the x-y plane and/or second tilt signal 408 about the x-axis of the x-y plane) based on the third signal (e.g., the one or more third sense signals corresponding to tilt of the first fixed portion of the first MEMS layer and/or tilt of the second fixed portion of the second MEMS layer). In some embodiments, processing circuitry compensates an offset of the out-of-plane acceleration based on the tilt.

What is claimed is:

1. A multi-axis microelectromechanical system (MEMS) accelerometer, comprising:
   one or more anchors;
   a MEMS structure within a MEMS layer, comprising at least one proof mass coupled to the one or more anchors via one or more springs, the at least one proof mass configured to move out-of-plane in response to an out-of-plane force and to move in-plane in response to an in-plane force;
   one or more out-of-plane sense electrodes configured to measure the out-of-plane force based on the out-of-plane movement of the at least one proof mass;
   one or more in-plane sense electrodes configured to measure the in-plane force based on the in-plane movement of the at least one proof mass;
   one or more tilt sense electrodes configured to measure a tilt of a fixed portion of the MEMS layer; and
   a first signal and a second signal, wherein the first signal is applied to the at least one proof mass to produce one or more first sense signals with respect to the one or more in-plane sense electrodes and one or more second sense signals with respect to the one or more out-of-plane sense electrodes, and wherein the second signal is applied to the one or more tilt sense electrodes to produce one or more third sense signals with respect to the fixed portion of the MEMS layer.

2. The multi-axis MEMS accelerometer of claim 1, wherein the in-plane sense electrodes comprise a plurality of comb electrodes located in the MEMS layer.

3. The multi-axis MEMS accelerometer of claim 1, wherein the in-plane sense electrodes comprise one or more parallel plates located in the MEMS layer.

4. The multi-axis MEMS accelerometer of claim 1, wherein the one or more tilt sense electrodes are located on an upper surface of a substrate below a lower surface of the fixed portion of the MEMS layer.

5. The multi-axis MEMS accelerometer of claim 4, wherein the one or more out-of-plane sense electrodes are located on the upper surface of the substrate below a lower surface of the at least one proof mass.

6. The multi-axis MEMS accelerometer of claim 1, wherein the one or more in-plane sense electrodes are configured to measure the in-plane force based on a translation of the at least one proof mass with respect to the one or more in-plane sense electrodes.

7. The multi-axis MEMS accelerometer of claim 1, wherein the one or more out-of-plane sense electrodes are configured to measure the out-of-plane force based on an out-of-plane movement of the at least one proof mass with respect to the one or more out-of-plane sense electrodes.

8. The multi-axis MEMS accelerometer of claim 1, wherein the in-plane force is oriented in the MEMS layer, and wherein the out-of-plane force is oriented normal to the MEMS layer.

9. The multi-axis MEMS accelerometer of claim 8, wherein the MEMS accelerometer is configured to compensate an offset of the out-of-plane movement of the at least one proof mass based on the tilt of the fixed portion of the MEMS layer.

10. The multi-axis MEMS accelerometer of claim 1, wherein the one or more tilt sense electrodes are configured to measure the tilt of the fixed portion of the MEMS layer based on a distance between the fixed portion of the MEMS layer and the one or more tilt sense electrodes.

11. The multi-axis MEMS accelerometer of claim 1, further comprising processing circuitry configured to determine an in-plane acceleration from the one or more first sense signals, to determine an out-of-plane acceleration from the one or more second sense signals, and to determine the tilt of the fixed portion of the MEMS layer from the one or more third sense signals.

12. The multi-axis MEMS accelerometer of claim 11, wherein the in-plane sense electrodes extend from the fixed portion of the MEMS layer, and wherein the processing circuitry receives the one or more first sense signals and the one or more third sense signals from the fixed portion of the MEMS layer.

13. The multi-axis MEMS accelerometer of claim 12, wherein the processing circuitry separates the one or more first sense signals from the one or more third sense signals based on a first frequency of the first signal and a second frequency of the second signal.

14. The multi-axis MEMS accelerometer of claim 12, wherein the processing circuitry separates the one or more first sense signals from the one or more third sense signals based on a first phase of the first signal and a second phase of the second signal.

15. The multi-axis MEMS accelerometer of claim 12, wherein the processing circuitry separates the one or more first sense signals from the one or more third sense signals based on a first timing pattern of the first signal and a second timing pattern of the second signal.

16. The multi-axis MEMS accelerometer of claim 12, wherein the processing circuitry separates the one or more first sense signals from the one or more third sense signals based on respective orthogonal codes of the first signal and the second signal.

17. The multi-axis MEMS accelerometer of claim 12, wherein the processing circuitry receives the one or more second sense signals from the at least one proof mass.

18. A multi-axis microelectromechanical system (MEMS) accelerometer, comprising:
a first MEMS accelerometer, comprising:
a first MEMS structure in a first MEMS layer including a first proof mass configured to translate in-plane in response to a first in-plane force and to move out-of-plane in response to an out-of-plane force perpendicular to the first in-plane force;
a first fixed portion within the first MEMS layer, wherein one or more first in-plane electrodes are located adjacent to the first proof mass to form a first capacitance that changes with the in-plane translation of the first proof mass;
a first out-of-plane electrode located below the first proof mass to form a second capacitance that changes with the out-of-plane movement of the first proof mass; and
a tilt electrode located below the first fixed portion to form a third capacitor with the first fixed portion that has a third capacitance that is based on a tilt of the first fixed portion; and
processing circuitry configured to apply a first signal to the first proof mass to generate a first sense signal based on the first capacitance and a second sense signal based on the second capacitance, to apply a second signal to the tilt electrode to generate a third sense signal based on the third capacitance, to determine a first in-plane acceleration based on the first sense signal, to determine an out-of-plane acceleration based on the second sense signal, and to determine the tilt of the first fixed portion within the first MEMS layer based on the third sense signal.

19. The multi-axis MEMS accelerometer of claim 18, wherein the processing circuitry is further configured to compensate the out-of-plane acceleration based on the tilt.

20. The multi-axis MEMS accelerometer of claim 18, further comprising:
a second MEMS accelerometer, comprising:
a second MEMS structure in a second MEMS layer including a second proof mass configured to translate in-plane in response to a third in-plane force perpendicular to the first in-plane force and the out-of-plane force, and to move out-of-plane in response to the out-of-plane force;
a second fixed portion within the second MEMS layer, wherein one or more second in-plane electrodes are located adjacent to the second proof mass to form a fourth capacitance that changes with the in-plane translation of the second proof mass;
a second out-of-plane electrode located below the second proof mass to form a fifth capacitance that changes with the out-of-plane movement of the second proof mass; and
a second tilt electrode located below the second fixed portion to form a sixth capacitor with the second fixed portion that has a sixth capacitance that is based on a tilt of the second fixed portion; and
wherein the processing circuitry is further configured to apply the first signal to the second proof mass to generate a fourth sense signal based on the fourth capacitance and a fifth sense signal based on the fifth capacitance, to apply the second signal to the second tilt electrode to generate a sixth sense signal based on the sixth capacitance, to determine a second in-plane acceleration based on the fourth sense signal, to further determine the out-of-plane acceleration based on the fifth sense signal, and to determine the tilt of the second fixed portion within the second MEMS layer based on the sixth sense signal.

21. The multi-axis MEMS accelerometer of claim 20, wherein the processing circuitry is further configured to compensate the out-of-plane acceleration based on the tilt of the first fixed portion and the tilt of the second fixed portion.

22. A method, comprising:
receiving a first signal from a multi-axis MEMS accelerometer, wherein the first signal is based on an in-plane movement between a proof mass in a MEMS layer and at least one fixed electrode of a fixed portion of the MEMS layer, and wherein the first signal has a first frequency;
receiving a second signal from the multi-axis MEMS accelerometer, wherein the second signal is based on an out-of-plane movement between the proof mass and at least one out-of-plane sense electrode, and wherein the second signal has the first frequency;

receiving a third signal from the multi-axis MEMS accelerometer, wherein the third signal is based on an out-of-plane tilt of the fixed portion of the MEMS layer and at least one tilt electrode, wherein the third signal has a second frequency, and wherein the third signal is received as a combined signal with one of the first signal or the second signal;

demultiplexing, from the combined signal based on the first frequency and the second frequency, the third signal and the one of the first signal or the second signal within the combined signal;

determining an in-plane acceleration based on the first signal;

determining an out-of-plane acceleration based on the second signal; and determining a tilt based on the third signal.

23. The method of claim 22, further comprising compensating the out-of-plane acceleration based on the tilt.

* * * * *